United States Patent
Shimomura

(10) Patent No.: US 7,500,311 B2
(45) Date of Patent: Mar. 10, 2009

(54) METHOD OF LUBRICATING ROLLER BEARING

(75) Inventor: Toshiaki Shimomura, Nara (JP)

(73) Assignee: Jtekt Corporation, Chuo-ku, Osaka (JP)

( * ) Notice: Subject to any disclaimer, the term of this patent is extended or adjusted under 35 U.S.C. 154(b) by 505 days.

(21) Appl. No.: 10/829,990

(22) Filed: Apr. 23, 2004

(65) Prior Publication Data

US 2004/0213494 A1  Oct. 28, 2004

(30) Foreign Application Priority Data

Apr. 25, 2003  (JP) .................... P. 2003-122480

(51) Int. Cl.
  *F16C 19/00* (2006.01)
(52) U.S. Cl. .................... 29/898.1; 29/407.05; 184/7.4; 384/462
(58) Field of Classification Search ............... 29/898.1, 29/407.05, 407.09, 407.1, 898.02, 898.04; 384/462, 448, 473, 474, 475, 470, 467; 184/108, 184/6.1, 6.28, 7.4, 26; 700/90
  See application file for complete search history.

(56) References Cited

U.S. PATENT DOCUMENTS

| | | | | |
|---|---|---|---|---|
| 4,222,283 A | * | 9/1980 | Nagy | 74/467 |
| 4,738,336 A | * | 4/1988 | Smith et al. | 184/6.4 |
| 5,106,209 A | * | 4/1992 | Atkinson et al. | 384/475 |
| 5,671,825 A | * | 9/1997 | Wong et al. | 184/6.4 |
| 6,261,003 B1 | | 7/2001 | Dusserre-Telmon et al. | |
| 7,000,734 B2 | * | 2/2006 | Nawamoto et al. | 184/6.26 |

FOREIGN PATENT DOCUMENTS

| | | | |
|---|---|---|---|
| DE | 199 59 472 | | 10/1999 |
| JP | 5-60145 | | 3/1993 |
| JP | 06264934 A | * | 9/1994 |
| JP | 8-270660 | | 10/1996 |
| WO | WO 01/55634 A2 | | 8/2001 |
| WO | WO 01/55634 A3 | | 8/2001 |

OTHER PUBLICATIONS

European Search Report Dated Jul. 24, 2006.
Japanese Notice of Reason for Refusal dated Apr. 10, 2007 with English translation.

\* cited by examiner

*Primary Examiner*—Jermie E Cozart
(74) *Attorney, Agent, or Firm*—McGinn IP Law Group, PLLC

(57) ABSTRACT

A bearing device includes: an inner ring member through which a shaft is passed and which is supported rotatably about an axis of the shaft and includes an inner ring raceway surface; an outer ring member arranged concentrically with the inner ring member and including an outer ring raceway surface; a plurality of rollers arranged rollably between the inner ring raceway surface and the outer ring raceway surface; a lubricating path through which lubricant is supplied to at least one of the inner ring raceway surface and the outer ring raceway surface; and a lubricating device which supplies the lubricant to the lubricating path according to rotating speed of the inner ring member about the axis.

10 Claims, 7 Drawing Sheets

METHOD OF LUBRICATING ROLLER BEARING

BACKGROUND OF THE INVENTION

The present invention relates to a roller bearing device, for example, used for a main shaft of a machine tool. The present invention also relates to a method of lubricating the roller bearing.

A tapered roller bearing device is known in which the generation of heat, which is made in the bearing when the bearing is rotated at high speed, is reduced. The tapered roller bearing device is disclosed in Patent Document 1 for example.

This tapered roller bearing device includes a hole penetrating the inner ring member in the axial direction and a hole penetrating the inner ring member from the hole in the radial direction. This hole is used as an oil supplying hole. A first nozzle from which pressured oil is injected is provided in the outer ring spacer while the first nozzle is opposed to an opening of the oil supplying hole. A through-hole penetrating the inner ring spacer in the axial direction is arranged in the circumferential direction alternately with the hole in the axial direction, and a second nozzle, which is open being opposed in the bearing, is provided in the outer ring spacer.

Oil injected from the first nozzle is supplied into the hole of the inner ring member formed in the axial direction. This oil flows outward by a centrifugal force generated by the rotation of the inner ring member and is supplied to a sliding contact portion between the large end face and the inner ring flange face which is a portion from which heat is generated at the maximum. Therefore, this oil deprives the sliding contact portion of generated heat. A portion of the oil injected from the first nozzle deprives the inner ring member of generated heat when the oil flows in the penetrating hole of the inner ring member. The oil injected from the second nozzle enters the inside of the bearing and lubricates a rolling contact face inside the bearing.

Patent Document 1

JP-A-8-270660

According to the tapered roller bearing device, heat generated when the tapered rollers are rolling can be removed, and the rolling contact face can be lubricated. However, according to the technique of the tapered roller bearing device, it is impossible to lubricate the inside of the bearing according to the rotating speed of the inner ring member. Therefore, under certain circumstances, an unnecessarily large quantity of lubricating oil is supplied to the bearing, and the stirring resistance of the rollers is increased.

SUMMARY OF THE INVENTION

Accordingly, it is desired to accomplish the technique of preventing the stirring resistance from increasing and suppressing the generation of heat quickly according to the rotating speed of the inner ring member.

In order to solve the aforesaid object, the invention is characterized by having the following arrangement.

(1) A bearing device comprising:
   an inner ring member through which a shaft is passed and which is supported rotatably about an axis of the shaft and includes an inner ring raceway surface;
   an outer ring member arranged concentrically with the inner ring member and including an outer ring raceway surface;
   a plurality of rollers arranged rollably between the inner ring raceway surface and the outer ring raceway surface;
   a lubricating path through which lubricant is supplied to at least one of the inner ring raceway surface and the outer ring raceway surface; and
   a lubricating device which supplies the lubricant to the lubricating path according to rotating speed of the inner ring member about the axis.

(2) The bearing device according to (1), wherein
   the lubricating path includes first and second lubricating paths, and
   the lubricating device includes a rotation detector for detecting the rotating speed of the inner ring member, a changeover valve device connected to the first and second lubricating path and a controller for controlling the changeover valve device according to a detecting result of the rotation detector.

(3) The bearing device according to (2), wherein the controller controls the changeover valve device so that the lubricant is supplied to one of the first and second lubricating paths when the rotating speed of the inner ring member is no more than a predetermined speed, and is supplied to the first and second lubricating paths when the rotating speed of the inner ring member is higher than the predetermined speed.

(4) A method of lubricating a bearing device including an inner ring member through which a shaft is passed and which is supported rotatably about an axis of the shaft and includes an inner ring raceway surface, an outer ring member arranged concentrically with the inner ring member and including an outer ring raceway surface, a plurality of rollers arranged rollably between the inner ring raceway surface and the outer ring raceway surface, and a lubricating path through which lubricant is supplied to at least one of the inner ring raceway surface and the outer ring raceway surface, the method comprising the steps of:
   detecting a rotating speed of the inner ring member about the axis; and
   supplying the lubricant to the lubricating path according to the detected rotating speed of the inner ring member.

(5) The method according to (4), wherein
   the lubricating path includes first and second lubricating paths, and
   the lubricant is supplied to one of the first and second lubricating paths when the rotating speed of the inner ring member is no more than a predetermined speed, and is supplied to the first and second lubricating paths when the rotating speed of the inner ring member is higher than the predetermined speed.

DETAILED DESCRIPTION OF PREFERRED EMBODIMENTS

Figure 1:
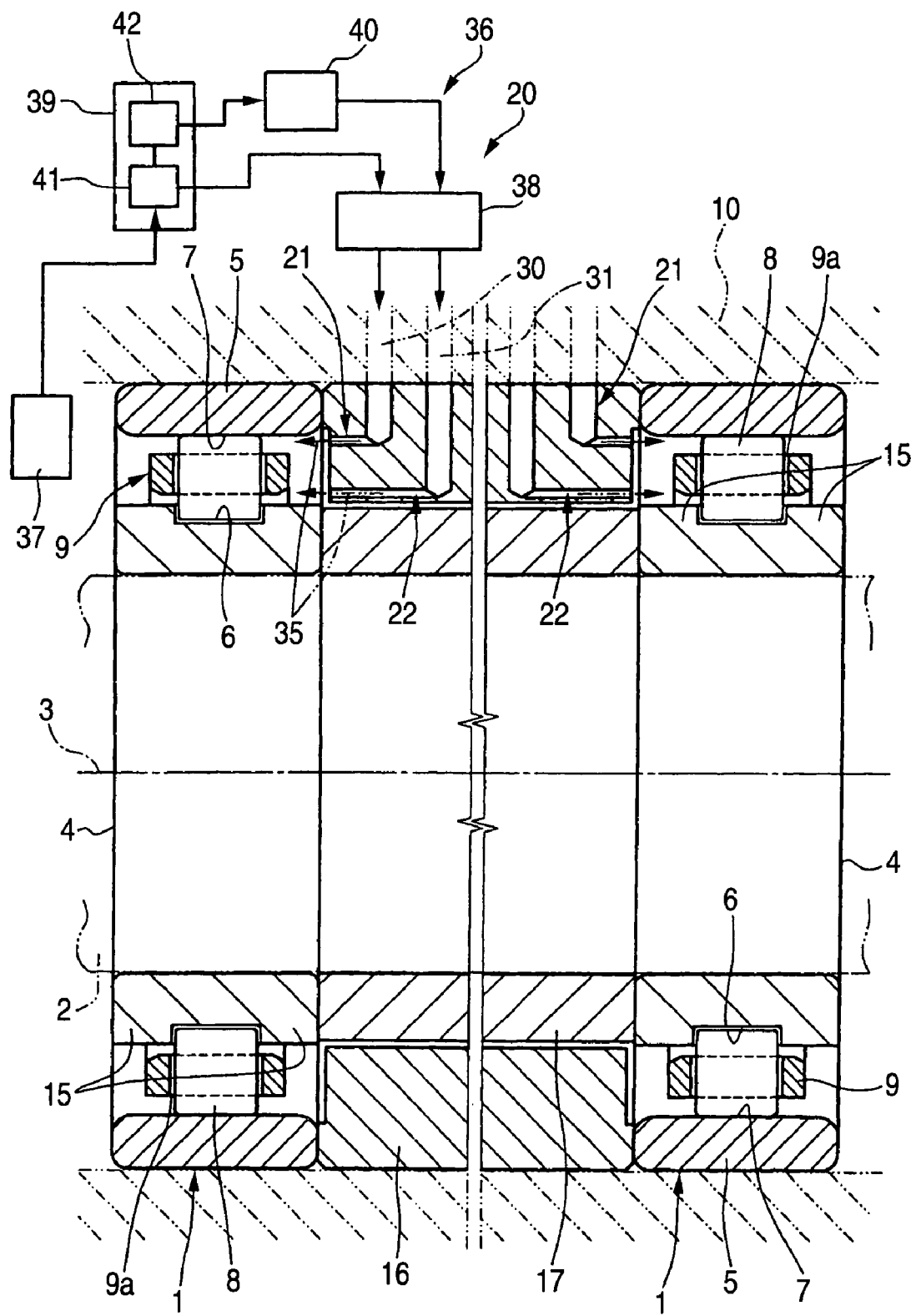
FIG. 1 is a partial sectional view of the machine tool main shaft in which the roller bearing of the first embodiment of the present invention is used.

Referring to the drawings, examples of the roller bearing device according to the embodiment of the present invention will be described below when a roller bearing device for supporting a drive shaft of a machine tool is taken up as an example.

First Embodiment

Figure 2:
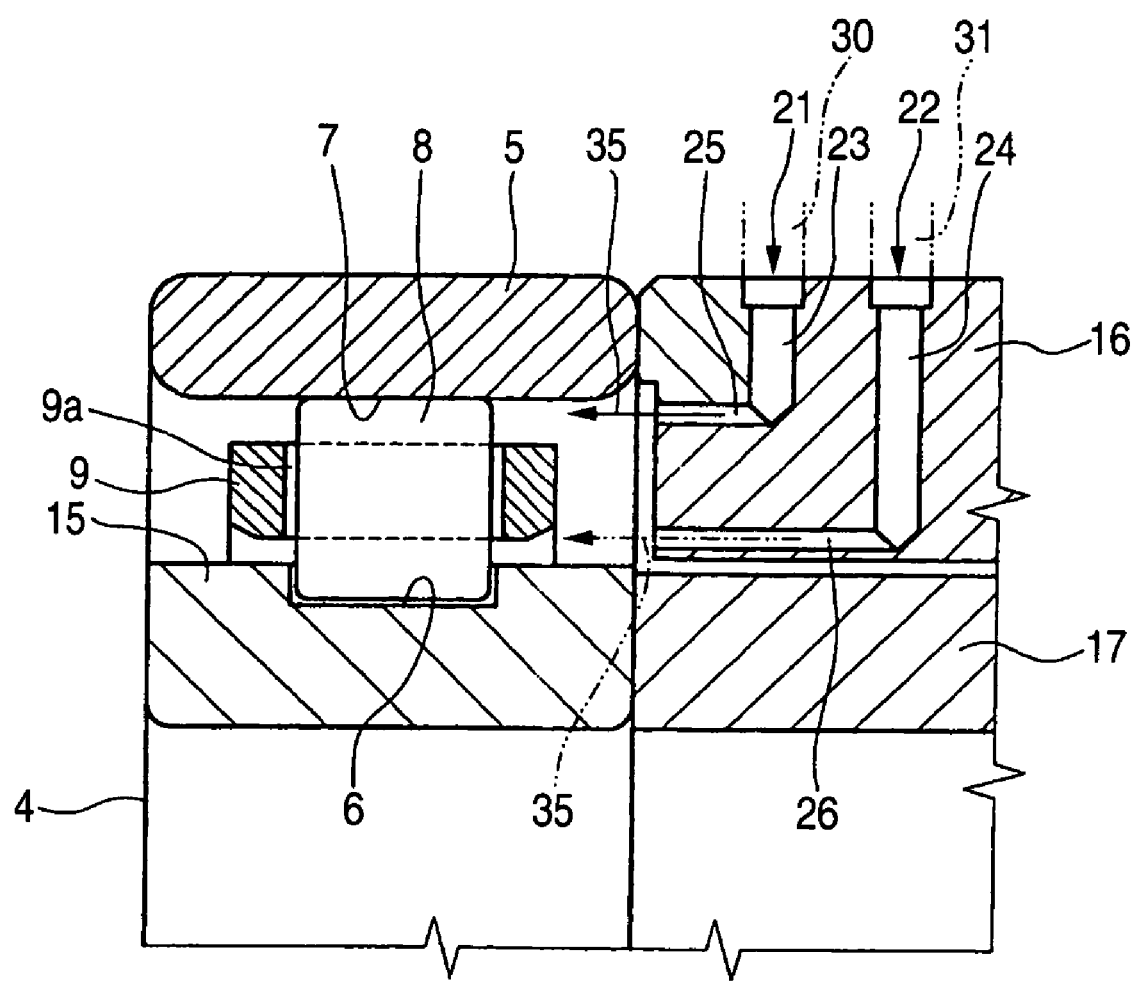
FIG. 2 is an enlarged sectional view of the primary portion of FIG. 1.

The first embodiment of the present invention will be explained below. FIG. 1 is a partially sectional view showing a portion of the machine tool in which a roller bearing according to the first embodiment of the present invention is used. FIG. 2 is an enlarged sectional view showing a primary portion of FIG. 1.

The roller bearing 1 of this embodiment is a cylindrical roller bearing. In this embodiment, a pair of cylindrical roller bearings 1 are arranged on opposite sides in the axial direction of the drive shaft 2 of the machine tool so that the drive shaft 2 can be rotatably supported. The structure of the bearing on one side is the same as the structure of the bearing on the other side. Therefore, the bearing 1 on one side is shown in FIG. 2.

As shown in FIG. 1, the roller bearing 1 includes: an inner ring member 4, into which the drive shaft 2 is press-fitted, and which is supported rotatably about the axis 3; an outer ring member 5 arranged concentrically with the inner ring member 4; a plurality of cylindrical rollers 8 arranged between the inner ring raceway surface 6 of the inner ring member 4 and the outer ring raceway surface 7 of the outer ring member 5 in such a manner that the cylindrical rollers 8 can be freely rolled; and a cage 9 having pockets 9a for holding these cylindrical rollers 8 at regular intervals in the circumferential direction.

The outer ring member 5 is arranged and fixed to the inner circumferential face of the housing 10. The shoulder portions 15, the diameters of the outer circumferential faces of which are larger than the diameter of the inner ring raceway surface 6, are formed on opposite sides of the inner ring raceway surface 6 of the inner ring member 4 in the axial direction. The cylindrical outer ring spacer 16 is interposed between the outer ring members 5, and the inner ring spacer 17 is interposed between the inner ring members 4.

As the drive shaft 2 is rotated about the axis 3, the inner ring member 4 rotates about the axis 3, and the cylindrical rollers 8 roll between the inner ring raceway surface 6 and the outer ring raceway surface 7. In order to reduce an increase in the stirring resistance so as to prevent the generation of heat and the occurrence of seize due to the rolling of the cylindrical rollers 8 between the inner ring raceway surface 6 and the outer ring raceway surface 7, the inside of the bearing must be lubricated.

Then, explanations will be made to the lubricating device 20 provided in the roller bearing 1. This lubricating device 20 includes a lubricant supply path arranged on the roller bearing 1 side of the outer ring spacer 16. This lubricant supply path includes a first lubricant supply path 21 and a second lubricant supply path 22.

As shown in FIG. 2, the first lubricant supply path 21 and the second lubricant supply path 22 respectively include: the large diameter paths 23, 24 formed in the outer ring spacer 16 in the radial direction; and the small diameter paths 25, 26 formed in the axial direction in the outer ring spacer 16 from the inward end portions in the radial direction of the large diameter paths 23, 24 to the roller bearing side.

The large path 24 of the second lubricant supply path 22 is longer than the large path 23 of the first lubricant supply path 21. The end portion of the small diameter path 25 of the first lubricant supply path 21 is arranged close to the outer ring member 5 in such a manner as to be opened toward the inner circumferential face end portion of the outer ring member 5 in the axial direction. The end portion of the small diameter path 26 of the second lubricant supply path 22 is arranged close to the inner ring member 4 in such a manner as to be opened toward the outer circumferential end portion of the inner ring member 4 in the axial direction.

As shown in FIG. 1, a first supply path 30 and a second supply path 31, which are respectively connected with the first lubricant supply path 21 and the second lubricant supply path 22, are formed in the housing 10. The lubricating device 20 includes a supply control device 36 for supplying lubricating oil 35 (oil and air) into the first supply path 30 and the second supply path 31.

This supply control device 36 includes: a rotation detector 37 for detecting the rotating speed of the inner ring member 4; a changeover valve device 38 connected to the first supply path 30 and the second supply path 31; a control unit 39 electrically connected to the rotation detector 37 and the changeover valve device 38; and a lubricant supply pump 40.

Concerning the control unit 39, for example, a common one-chip microcomputer is used for the control unit 39 which includes: a changeover unit 41 for outputting a changeover signal to the changeover valve device 38 according to a rotating speed signal sent from the rotation detector 37; and a drive unit 42 for outputting a drive signal to the drive portion of the lubricant supply pump 40. As described above, the roller bearing device is composed of the roller bearing 1 and the lubricating device 20.

Next, lubricating operation of lubricating the roller bearing 1 will be explained below. The rotation detector 37 detects the rotating speed of the drive shaft 2 at all times while the machine tool is being driven. The thus detected rotating speed is outputted into the changeover unit 41 of the control unit 39 and also outputted into the drive unit 42. Further, a drive signal is outputted from the drive unit 42 into the drive portion of the lubricant pump 40.

In the case where the rotation detector 37 detects a rotating speed signal representing the rotating speed not more than a predetermined speed, that is, in the case where the inner ring member 4 (drive shaft 2) is rotating at a low rotating speed, the changeover unit 41 outputs a drive signal to the drive portion of the lubricant supply pump 40 via the drive unit 42, and the changeover unit 41 outputs a drive control signal to the drive portion of the changeover valve device 38 so that the lubricating oil 35 can be supplied to the first supply path 30 and the supply of the lubricating oil 35 to the second supply path 31 can be shut off.

Therefore, in the case where the inner ring member 4 is rotating at a low speed, the lubricating oil 35 is supplied from the lubricant supply pump 40 into the first lubricant supply path 30 and the first lubricant path 21 via the changeover valve device 38. Therefore, the lubricating oil 35 is supplied from the opening of the first lubricant path 21 toward the outer ring raceway surface 7 side so that the inside of the roller bearing 1 can be lubricated by an appropriate quantity of lubricating oil 35.

In this connection, in the case where the rotation detector 37 detects a rotating speed signal representing the rotating speed higher than a predetermined rotating speed, that is, in the case where the inner ring member 4 is rotating at a high speed, the changeover unit 41 outputs a drive signal to the drive portion of the lubricant pump 40 via the drive unit 42, and the changeover unit 41 outputs a drive signal to the drive portion of the changeover valve device 38 so that the lubricating oil 35 can be supplied to the first supply path 30 and the lubricating oil 35 can be also supplied to the second supply path 31.

Therefore, in the case where the inner ring member 4 is rotating at high speed, the lubricating oil 35 is supplied from the lubricant supply pump 40 into the first supply path 30 and the first lubricant supply path 21 via the changeover valve device 38. Therefore, the lubricating oil 35 is supplied from the opening of the first lubricant supply path 21 toward the outer ring raceway surface 7. At the same time, the lubricating oil 35 is supplied from the opening of the second supply path 31 and the second lubricant supply path 22 toward the inner ring raceway surface 6. In virtue of the foregoing, the inside of the roller bearing 1 can be lubricated by a quantity of lubricating oil 35 appropriate for the high speed rotation.

In this connection, when the rotation detector 37 detects that the rotating speed has changed from the high speed to the low speed, the signal is output to the changeover valve device 38 via the drive unit 42, and the changeover valve device 38 can be changed over so that the supply of the lubricating oil 35 to the second supply path 31 can be shut off. At the same time, the changeover valve device 38 is changed over so that only a current of air not containing the lubricating oil 35 can be supplied into the second supply path 31 for a predetermined period of time.

Then, the current of air not containing the lubricating oil 35 is discharged from the opening of the second lubricant supply path 22. Therefore, the lubricating oil 35 sticking onto the inner ring raceway surface 6 or the outer circumferential face of the inner ring raceway surface 4 is discharged outside the roller bearing 1 being blown by the current of air. In virtue of the foregoing, a quantity of lubricating oil 35 appropriate for the rotation of low speed can be ensured inside the roller bearing 1, and an increase in the temperature of the raceway surface of the roller bearing 1 can be suppressed and the occurrence of seize can be prevented.

As described above, according to the first embodiment of the present invention, a portion to which the lubricating oil 35 is supplied is selected according to the rotating speed of the inner ring member 4, and a necessary quantity of lubricating oil 35 can be supplied. Accordingly, an increase in the stirring resistance of the roller bearing 1 and a rise in the temperature of the raceway surface can be suppressed and the occurrence of seize can be prevented.

Second Embodiment

Figure 3:
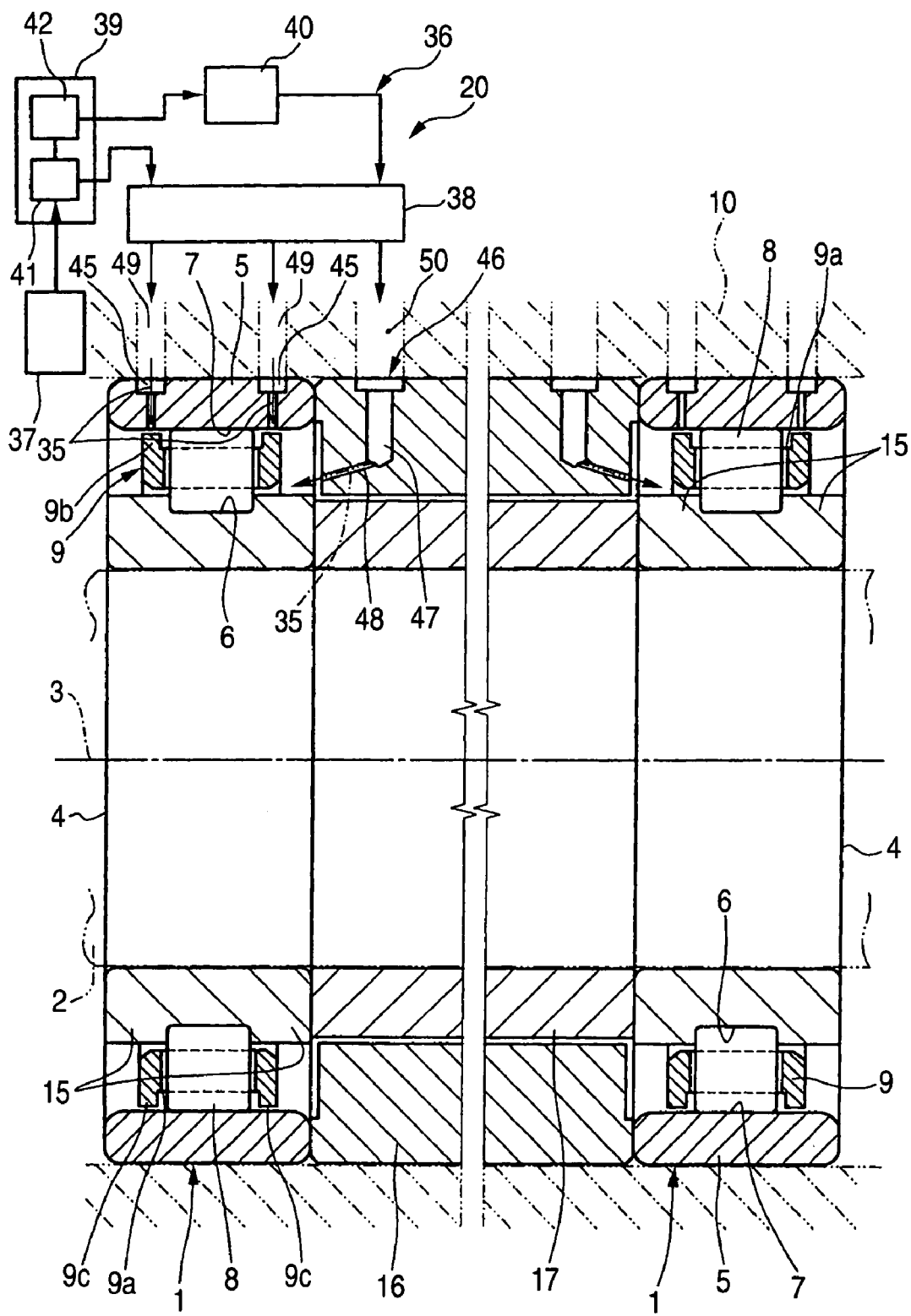
FIG. 3 is a partial sectional view of the machine tool main shaft in which the roller bearing of the second embodiment of the present invention is used.
Figure 4:
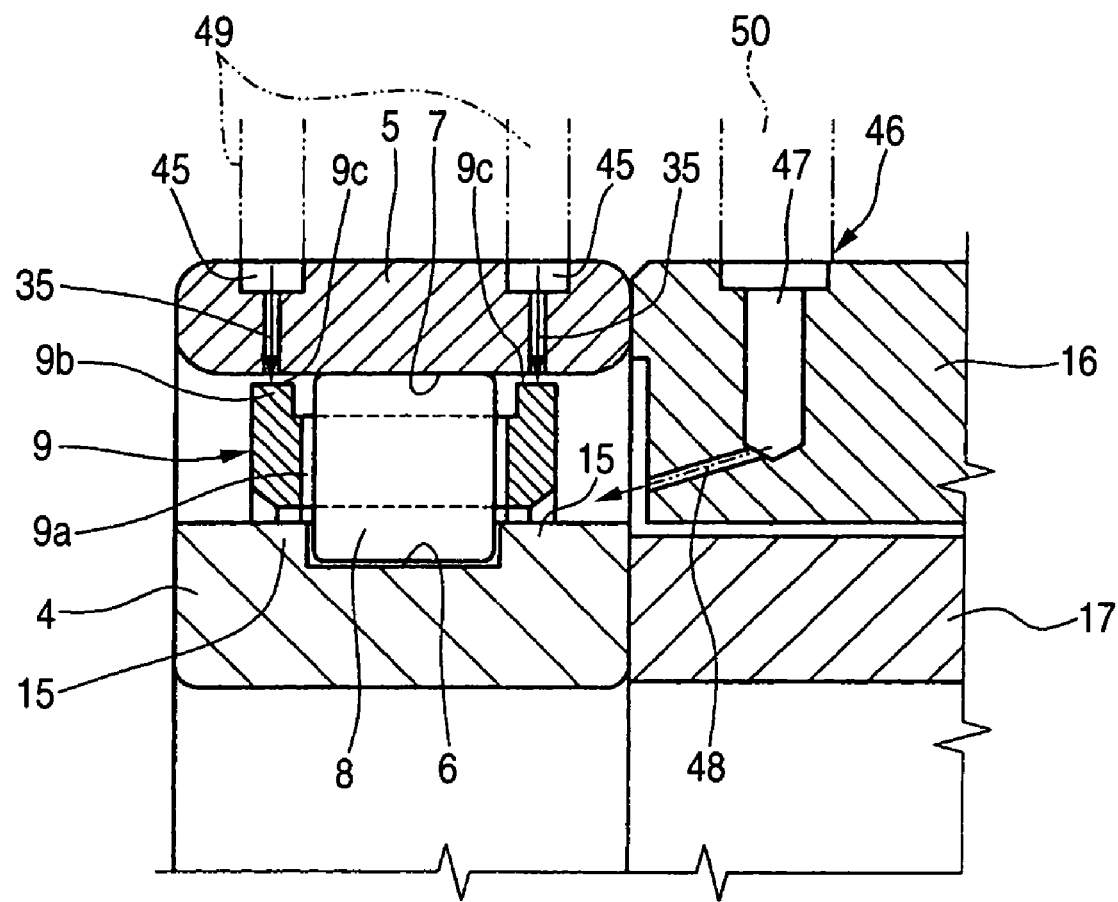
FIG. 4 is an enlarged sectional view of FIG. 3.

Next, referring to the sectional view of FIG. 3 and the enlarged sectional view of FIG. 4, the second embodiment according to the present invention will be explained below. The roller bearing of the second embodiment of the present invention includes: an outer ring member 5; an inner ring member 4; a plurality of cylindrical rollers 8; and a cage 9. The structure of the inner ring member 4 is the same as that of the first embodiment. Therefore, same reference marks are used to indicate like parts, and the explanations are omitted here.

The cage 9 has annular portions 9b to be guided which are protruded outside in the radial direction and arranged on opposite sides of the pockets 9a in the axial direction. This cage 9 is an outer ring guide cage in which the outer circumferential faces 9c of the portions 9b are guided by the inner circumferential face of the outer ring member 5.

Next, the lubricating device 20 will be explained below. The lubricating device 20 includes lubricant supply paths 45 which are formed in the radial direction at predetermined positions of the outer ring member 5 in the circumferential direction. These lubricant supply paths 45 are formed in the radial direction in portions of the outer ring member 5 in such a manner as to be opposed to and agree with the portions 9b to be guided in the axial direction. Accordingly, two lubricant supply paths 45 are formed in such a manner as to form a pair in the axial direction.

The lubricating device 20 has a lubricant supply path 46 formed in the outer ring spacer 16. This lubricant supply path 46 includes: a large diameter portion 47 formed in the outer ring spacer 16 in the radial direction; and a small diameter portion 48 formed from the inward end portion in the radial direction of this large diameter portion 47 toward the outer circumferential face side of the inner ring member 4 of the roller bearing 1.

In the housing 10, first supply paths 49 and a second supply path 50, which are respectively communicated with the lubricant supply paths 45 and 46, are formed. The lubricating device 20 has the supply control unit 36 for supplying the lubricating oil 35 (oil and air) to the first supply path 49 and the second supply path 50.

Next, different points of the supply control unit 36 of the second embodiment from the supply control unit 36 of the first embodiment will be explained below. The changeover valve device 38 of the second embodiment has the constitution in which, according to a signal sent from the changeover unit 41, either first supply path 49 or second supply path 50 is selected or both the first supply path 49 and the second supply path 50 are selected, so that the first supply path 49 or the second supply path 50 can be supplied with the lubricating oil 35 or both the first supply path 49 and the second supply path 50 can be supplied with the lubricating oil 35. Other points of this embodiment are the same as those of the first embodiment described before. Therefore, same reference marks are used to indicate like parts, and the explanations are omitted here.

In the above constitution, in the case where the rotation detector 37 detects a rotating speed signal representing the rotating speed not more than a predetermined speed, that is, in the case where the inner ring member 4 (drive shaft 2) is rotating at a low rotating speed, the changeover unit 41 outputs a drive signal to the drive portion of the lubricant supply pump 40 via the drive unit 42, and the changeover unit 41 outputs a drive control signal to the drive portion of the changeover valve device 38 so that the lubricating oil 35 can be supplied to the first supply path 49 and the supply of the lubricating oil 35 to the second supply path 50 can be shut off.

In the case where the inner ring member 4 is rotating at a low speed, the lubricating oil 35 is supplied from the lubricant supply pump 40 into the first supply path 49 and from the opening of the lubricant supply path 45 to the outer circumferential face 9c of the portion 9b of the cage 9, that is, the lubricating oil 35 is discharged toward the face to be guided, so that the inside of the roller bearing 1 can be lubricated by an appropriate quantity of lubricating oil 35.

In this connection, in the case where the rotation detector 37 detects a rotating speed signal representing the rotating speed higher than a predetermined rotating speed, that is, in the case where the inner ring member 4 is rotating at a high speed, the changeover unit 41 outputs a drive signal to the drive portion of the lubricant pump 40 via the drive unit 42, and the changeover unit 41 outputs a drive signal to the drive portion of the changeover valve device 38 so that the lubricating oil 35 can be supplied to the first supply path 49 and the lubricating oil 35 can be also supplied to the second supply path 50.

Therefore, in the case where the inner ring member 4 is rotating at a high speed, the lubricating oil 35 is supplied from the lubricant supply pump 40 into the first supply path 49 and the lubricant supply path 45 via the changeover valve device 38. Therefore, the lubricating oil 35 is supplied from the opening of the lubricant supply path 45 toward the outer circumferential face 9c of the portion 9b. At the same time, the lubricating oil 35 is supplied from the second supply path 50 to the lubricant supply path 46. The lubricating oil 35 is discharged from its opening toward the inner ring raceway surface 6. In virtue of the foregoing, the inside of the roller bearing 1 can be lubricated by a quantity of lubricating oil 35 appropriate for the high speed rotation.

In this connection, when the rotation detector 37 detects that the rotating speed has changed from the high speed to the low speed, the signal is outputted to the changeover valve device 38 via the drive unit 42 and the lubricant supply pump 40, and the changeover valve device 38 can be changed over so that the supply of the lubricating oil 35 to the second supply path 50 can be shut off. At the same time, the changeover valve device 38 is changed over so that only a current of air not containing the lubricating oil 35 can be supplied into the second supply path 50 for a predetermined period of time.

Then, a current of air not containing the lubricating oil 35 is discharged from the opening of the lubricant supply path 46. Therefore, the lubricating oil 35 sticking onto the inner ring raceway surface 6 or the outer circumferential face of the inner ring member 4 is discharged outside the roller bearing 1 being blown by the pressure of the current of air. In virtue of the foregoing, a quantity of lubricating oil 35 appropriate for the rotation of low speed can be ensured inside the roller bearing 1, and an increase in the temperature of the raceway surface of the roller bearing 1 can be suppressed and the occurrence of seize can be prevented.

Third Embodiment

Figure 5:
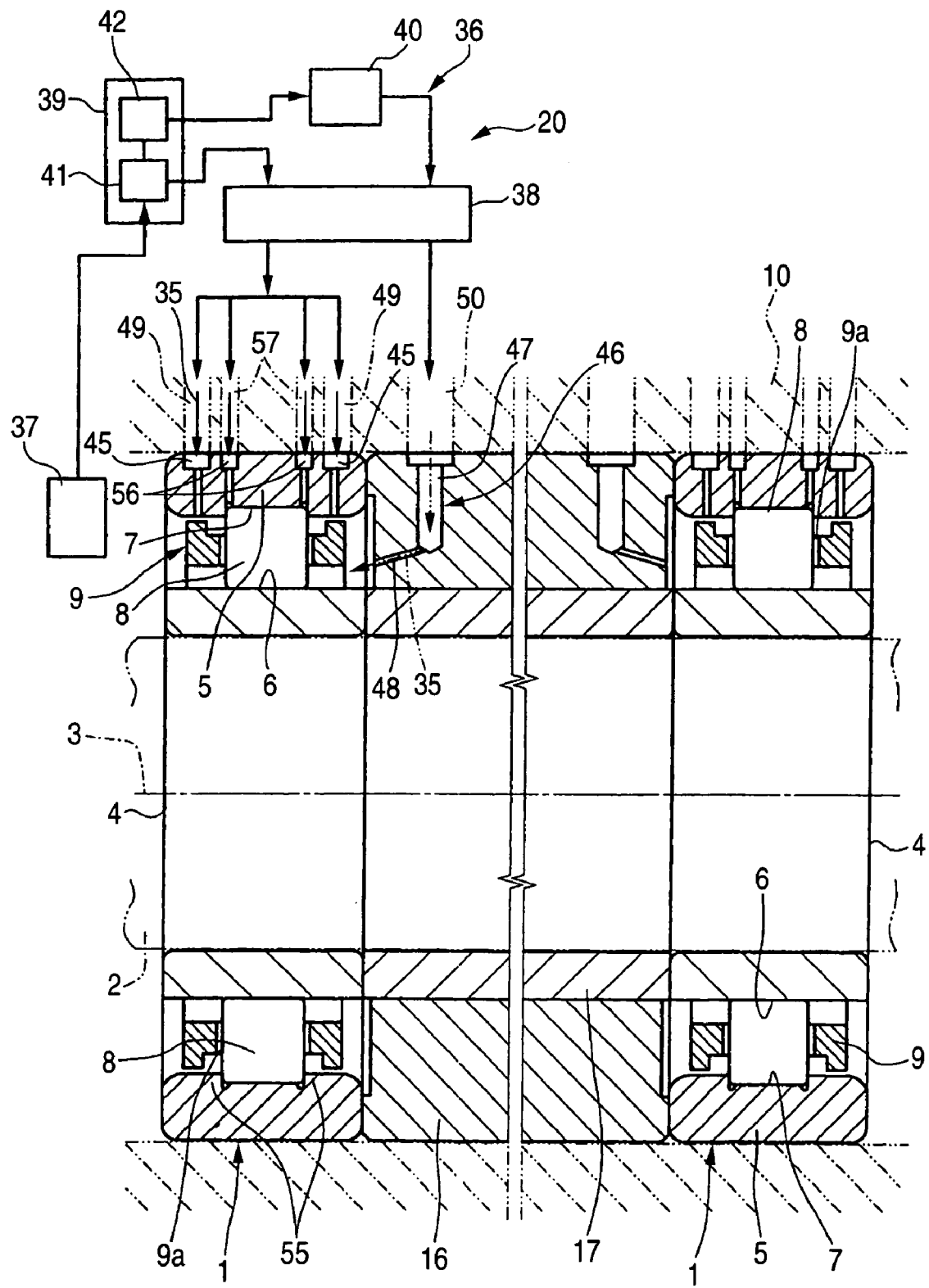
FIG. 5 is a partial sectional view of the machine tool main shaft in which the roller bearing of the third embodiment of the present invention is used.
Figure 6:
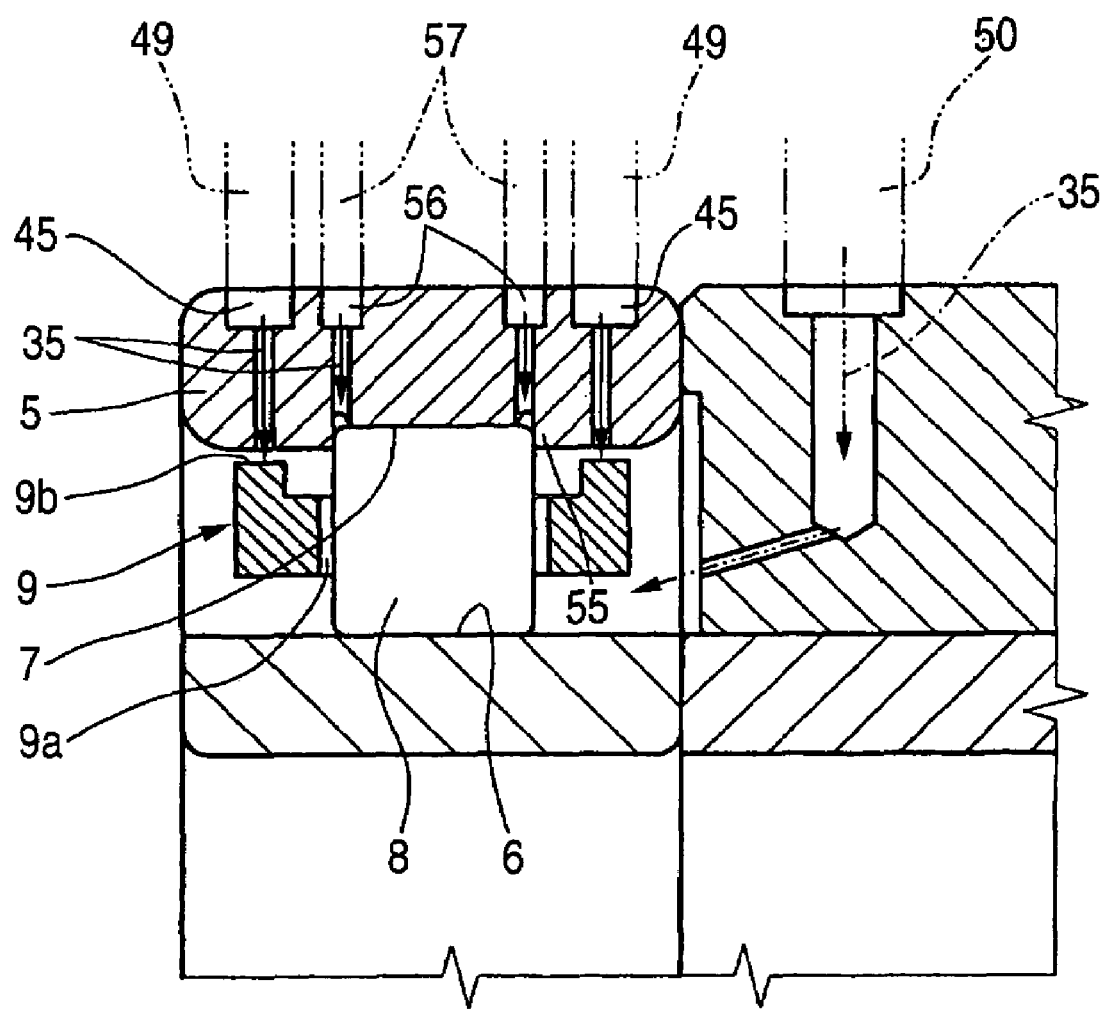
FIG. 6 is an enlarged sectional view of FIG. 4.

Next, referring to FIGS. 5 and 6, the third embodiment of the present invention will be explained below. Different points of the roller bearing device of the third embodiment of the present invention from those of the roller bearing of the second embodiment are explained as follows.

The roller bearing 1 of the roller bearing device of the third embodiment includes shoulder portions 55, the diameter of the inner circumferential face of which is smaller than the diameter of the outer ring raceway surface 7, and which is provided on opposite sides of the outer ring raceway surface 7 of the outer ring member 5. The lubricating device 20 includes a pair of lubricant supply path 56, which are arranged at the boundary portions between the outer ring raceway 7 and the shoulder portions 55, from which the lubricating oil 35 is discharged toward the outer ring raceway surface 7. In each lubricant supply path 56, the supply path 57 provided in the housing 10 is formed. These supply paths 57 are connected to the changeover valve device 38. Other points of the structure of the lubricating device 20 are the same as those of the second embodiment described before.

In the above constitution, in the case where the rotation detector 37 detects a rotating speed signal representing the rotating speed not more than a predetermined speed, that is, in the case where the inner ring member 4 (drive shaft 2) is rotating at a low rotating speed, the changeover unit 41 outputs a drive signal to the drive portion of the lubricant supply pump 40 via the drive unit 42, and the changeover unit 41 outputs a drive control signal to the drive portion of the changeover valve device 38 so that the lubricating oil 35 can be supplied to the first supply path 49 and the supply path 57 and so that the lubricating oil 35 can be supplied to the lubricant supply paths 45, 56. Further, the changeover unit 41 also outputs a drive signal to the drive portion of the changeover valve device 38 so that the supply of the lubricating oil 35 to the second supply path 50 can be shut off.

Therefore, in the case where the inner ring member 4 is rotating at low speed, the lubricating oil 35 is discharged toward the outer circumferential face 9c of the portion 9b of the cage 9 and the inner ring raceway surface 7, so that the inside of the roller bearing 1 can be lubricated by an appropriate quantity of lubricating oil 35.

In this connection, in the case where the rotation detector 37 detects a rotating speed signal representing the rotating speed higher than a predetermined rotating speed, that is, in the case where the inner ring member 4 is rotating at a high speed, the changeover unit 41 outputs a drive signal to the drive portion of the lubricant pump 40 via the drive unit 42, and the changeover unit 41 also outputs a drive signal to the drive portion of the changeover valve device 38 so that the lubricating oil 35 can be supplied to the first supply path 49 and the supply path 57 and so that the lubricating oil 35 can be also supplied to the second supply path 50.

Therefore, in the case where the inner ring member 4 is rotating at high speed, the lubricating oil 35 is supplied to the outer circumferential face 9c of the portion 9b of the cage 9, the outer ring raceway surface 7 and the inner ring raceway surface 6, so that the inside of the roller bearing 1 can be lubricated by an appropriate quantity of lubricating oil 35.

In this connection, when the rotation detector 37 detects that the rotating speed has changed from the aforementioned high speed to the low speed, the signal is outputted to the changeover valve device 38 via the drive unit 42 and the lubricant supply pump 40, and the changeover valve device 38 can be changed over so that the supply of the lubricating oil 35 to the second supply path 50 can be shut off. At the same time, the changeover valve device 38 is changed over so that only a current of air not containing the lubricating oil 35 can be supplied into the second supply path 50 for a predetermined period of time.

Then, a current of air not containing the lubricating oil 35 is discharged from the opening of the lubricant supply path 46. Therefore, the lubricating oil 35 sticking onto the inner ring raceway surface 6 or the outer circumferential face of the inner ring member 4 is discharged outside the roller bearing 1 being blown by the pressure of the current of air. In virtue of the foregoing, a quantity of lubricating oil 35 appropriate for the rotation of low speed can be ensured inside the roller bearing 1, and an increase in the temperature of the raceway surface of the roller bearing 1 can be suppressed and the occurrence of seize can be prevented.

Fourth Embodiment

Figure 7:
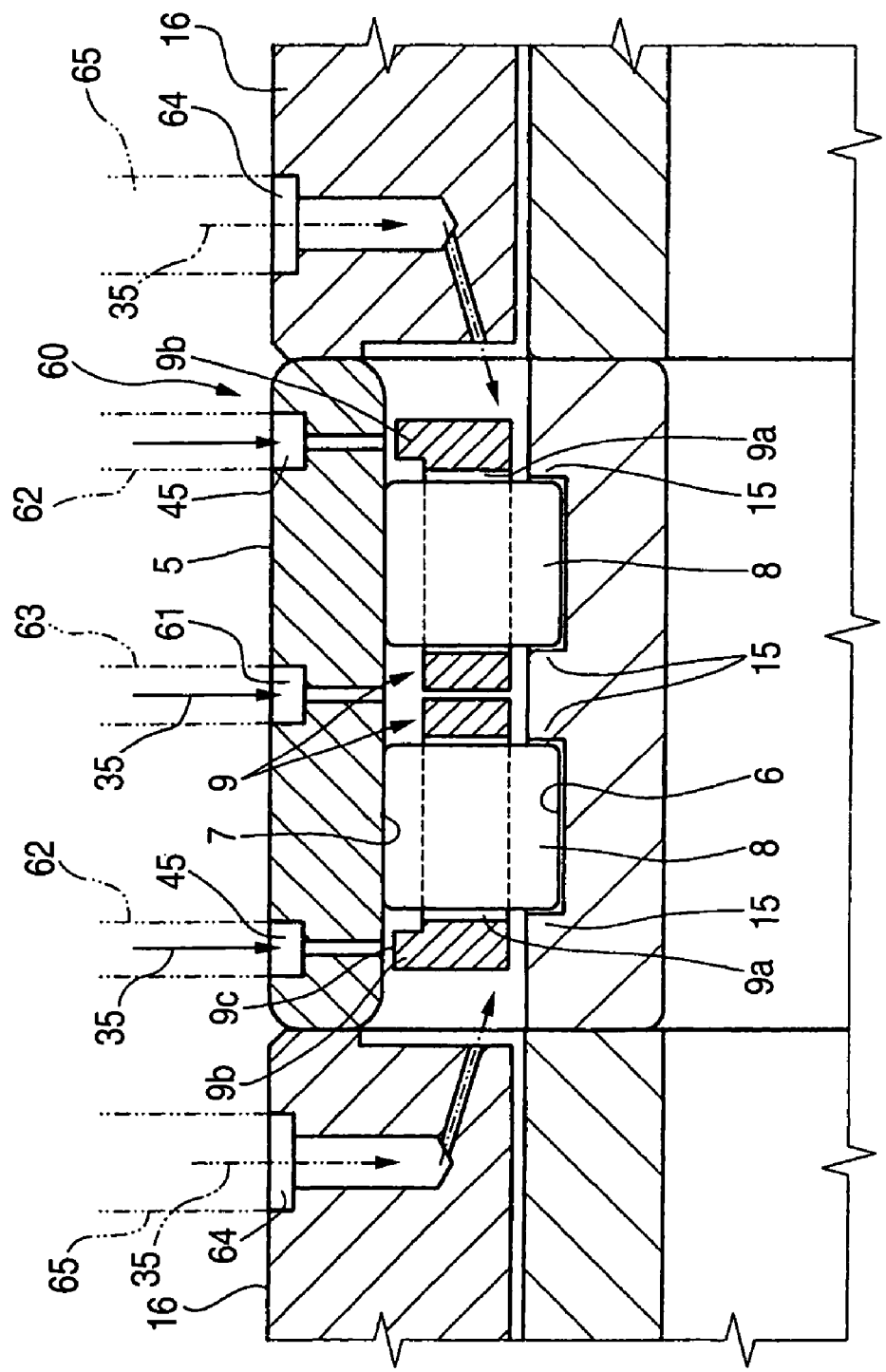
FIG. 7 is an enlarged sectional view of the roller bearing device shown in the fourth embodiment of the present invention.

Next, referring to the sectional view of FIG. 7, the fourth embodiment of the present invention will be explained below. The bearing device 1 of the present invention includes a double row cylindrical roller bearing 60, the inner ring member 4 of which has the shoulder portions. The cylindrical rollers 8, 8 are held in the pockets 9a of the cage 9 and arranged at regular intervals in the circumferential direction. The cage 9 is an outer ring guide cage. Each cage 9 is provided with an annular portion 9b to be guided arranged in an outward portion in the axial direction in such a manner that the annular portion 9b protrudes outward in the radial direction.

In the outer ring member 5, two lubricant supply portions 45 for supplying the lubricating oil 35 onto the outer circumferential face 9c of the portion 9b are formed in such a manner that the two lubricant supply portions 45 make a pair in the axial direction. In the housing 10, the supply path 62 communicating with the lubricant supply path 45 is formed.

At the center of the outer ring member 5 in the axial direction, the lubricant supply path 61 for supplying the lubricating oil 35 onto the outer ring raceway surface 7 is formed in the radial direction. The supply path 63 communicating with the lubricant supply path 61 is formed in the housing 10. In the outer ring spacer (outer ring collar) 16, the lubricant supply path 64 for injecting the lubricating oil 35 onto opposite sides of the outer circumferential face of the double row cylindrical roller bearing 60 is formed. In the housing 10, the supply path 65 communicating with the lubricant supply path 64 is formed. The supply paths 62, 63, 65 are connected to the changeover valve device 38.

The control unit 39 of the supply control unit 36 of the lubricating device 20 drives the changeover valve device 38 so that the lubricating oil 35 can be supplied to the supply paths 62, 63 at the time of operation of a low rotating speed. The control unit 39 of the supply control unit 36 of the lubricating device 20 drives the changeover valve device 38 so that the lubricating oil 35 can be supplied to the supply paths 62, 63, 65 at the time of operation of a high rotating speed.

In virtue of the foregoing, at the time of operation of a low rotating speed, the lubricating oil 35 is supplied toward the outer circumferential face 9c of the portion 9b of the cage 9. At the time of operation of a high rotating speed, the lubricating oil 35 is supplied toward the outer circumferential face 9c of the portion 9b of the cage 9, the outer ring raceway surface 7 and the inner ring raceway surface 6. In this way, the inside of the roller bearing 1 can be lubricated by an appropriate quantity of lubricating oil 35.

In the case where the rotating speed is changed from high to low, the control unit 39 drives the changeover valve device 38 so that the lubricating oil 35 can be supplied to the supply paths 62, 63 and so that an air current not containing the lubricating oil 35 can be supplied for a predetermined period of time. In virtue of the foregoing, a redundant quantity of lubricating oil 35 which is supplied to the inner ring raceway surface 6 side at the time of rotating at a high speed can be removed to a predetermined position. As shown in FIG. 1, other points of the structure of the supply control unit 36 are the same as those of the above embodiments. Therefore, the explanations are omitted here.

As can be seen from the above explanations, in the present invention, a portion to which the lubricating oil is supplied is selected according to the rotating speed of the inner ring member. Therefore, the inside of the bearing can be lubricated in quick response by an appropriate quantity of lubricating oil. Further, it is possible to prevent an increase in the stirring resistance of the roller bearing. Therefore, a rise in the temperature of the roller bearing can be prevented.

What is claimed is:

1. A method of lubricating a bearing device including an inner ring member through which a shaft is passed and which is supported rotatably about an axis of the shaft and includes an inner ring raceway surface, an outer ring member arranged concentrically with the inner ring member and including an outer ring raceway surface, a plurality of rollers arranged rollably between the inner ring raceway surface and the outer ring raceway surface, and first and second lubricating paths through which lubricant is supplied to at least one of the inner ring raceway surface and the outer ring raceway surface, the method comprising:

detecting a rotating speed of the inner ring member about the axis;

supplying the lubricant to at least one of the first and second lubricating paths according to the detected rotating speed of the inner ring member; and controlling a supply of the lubricant to the first and second lubricating paths using a changeover valve, wherein the lubricant is supplied to the first lubricating path when the rotating speed of the inner ring member is no more than a predetermined speed, and wherein the lubricant is supplied to the first and second lubricating paths when the rotating speed of the inner ring member is higher than the predetermined speed.

2. The method according to claim 1, further comprising supplying a control unit with the detected rotation speed of the inner ring member.

3. The method according to claim 2, further comprising sending a changeover signal from the control unit to the changeover valve according to the detected rotation speed of the inner ring member.

4. The method according to claim 2, further comprising sending a drive signal from the control unit to a lubricant pump according to the detected rotation speed of the inner ring member.

5. The method according to claim 2, further comprising sending a changeover signal from the control unit to the changeover valve to channel the lubricant to the first lubricating path when the detected rotation speed is no more than the predetermined speed.

6. The method according to claim 2, further comprising sending a changeover signal from the control unit to the changeover valve to channel the lubricant to the first and second lubricating paths when the detected rotation speed is higher than the predetermined speed.

7. The method according to claim 2, further comprising sending a drive signal from the control unit to a lubricant pump to pump the lubricant to the first lubricating path when the detected rotation speed is no more than the predetermined speed.

8. The method according to claim 2, further comprising sending a drive signal from the control unit to a lubricant pump to pump the lubricant to the first and second lubricating paths when the detected rotation speed is higher than the predetermined speed.

9. A method of lubricating a bearing device, comprising:

detecting a rotating speed of an inner ring member, said inner ring member supported rotatably about an axis of a shaft that passes through the inner ring member, said rotating speed detected about the axis;

supplying a lubricant to at least one of a first lubricating path and a second lubricating path according to the rotating speed of the inner ring member, said first and second lubricating paths supplying at least one of an inner ring raceway surface of said inner ring member and an outer ring raceway surface of an outer ring member, said outer ring member arranged concentrically with said inner ring member; and controlling a supply of the lubricant to the first and second lubricating paths using a changeover valve, wherein the lubricant is supplied to the first lubricating path when the rotating speed of the inner ring member is no more than a predetermined speed, and wherein the lubricant is supplied to the first and second lubricating paths when the rotating speed of the inner ring member is higher than the predetermined speed.

10. The method of according to claim 9, wherein a plurality of rollers are arranged rollably between the inner ring raceway surface and the outer ring raceway surface.

* * * * *